W. T. SHEA & F. MANLEY.
WHEEL FOR VEHICLES.
APPLICATION FILED JUNE 22, 1914.
1,113,583.
Patented Oct. 13, 1914.
2 SHEETS—SHEET 1.
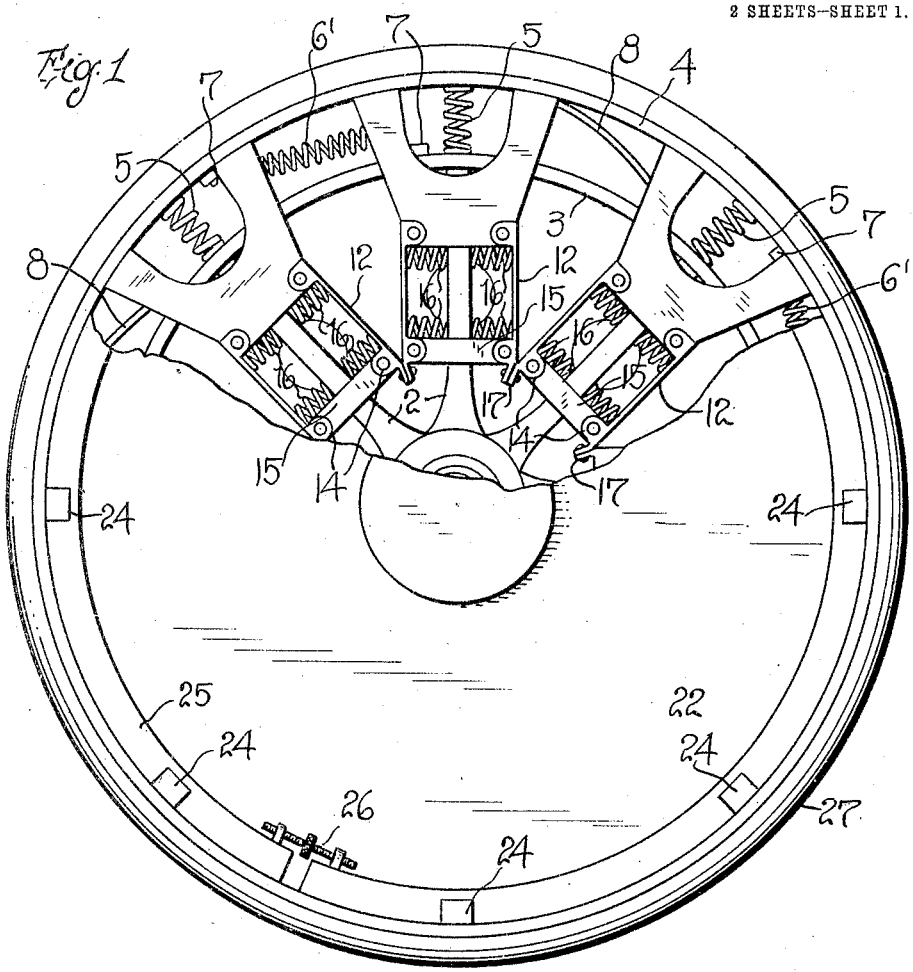
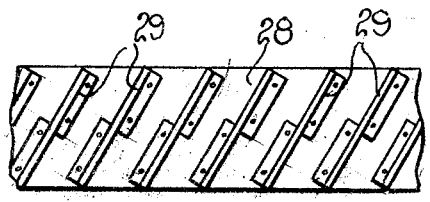
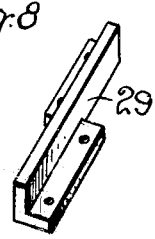
Inventors
W. T. SHEA
F. MANLEY
By Watson E. Coleman
Attorney

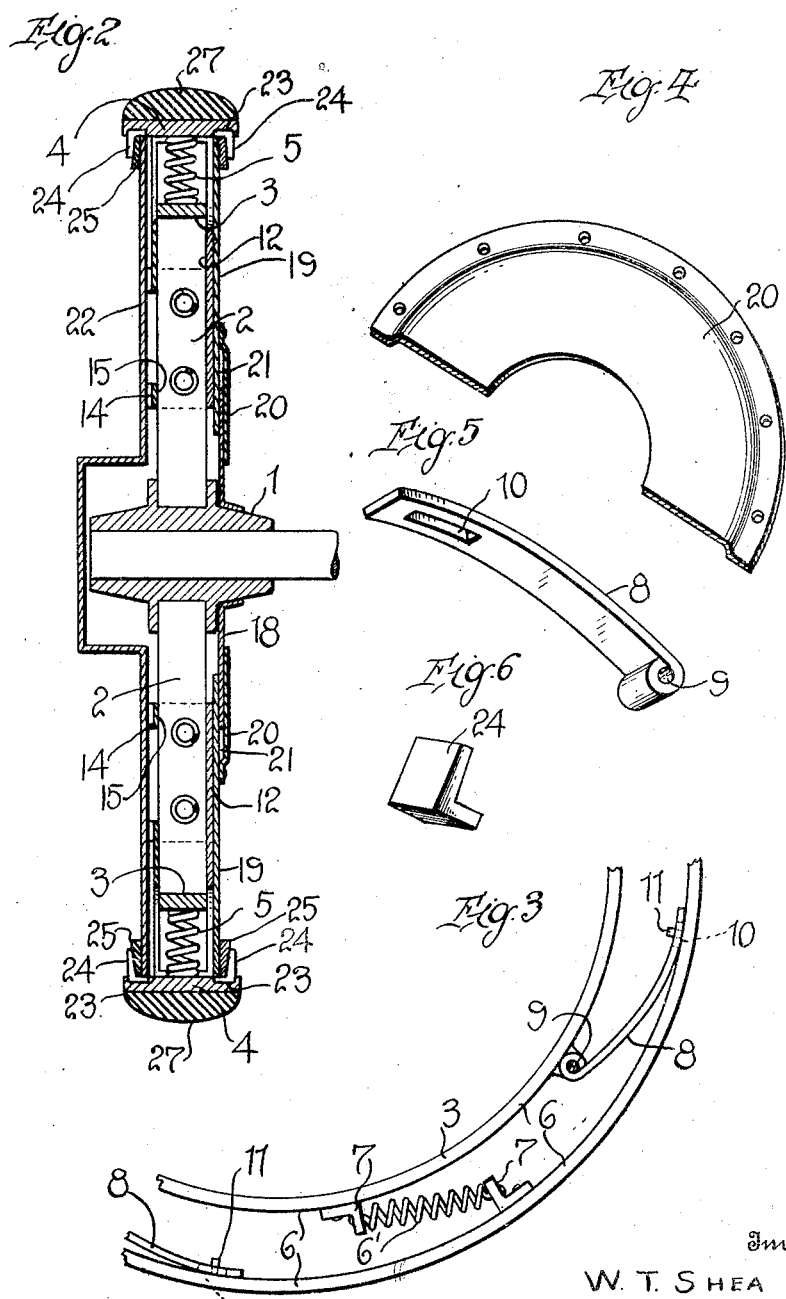

UNITED STATES PATENT OFFICE.

WILLIAM T. SHEA AND FRANK MANLEY, OF SILVERTON, COLORADO.

WHEEL FOR VEHICLES.

1,113,583.                    Specification of Letters Patent.    Patented Oct. 13, 1914.

Application filed June 22, 1914.  Serial No. 846,676.

*To all whom it may concern:*

Be it known that we, WILLIAM T. SHEA and FRANK MANLEY, citizens of the United States, residing at Silverton, in the county of San Juan and State of Colorado, have invented certain new and useful Improvements in Wheels for Vehicles, of which the following is a specification, reference being had to the accompanying drawings.

This invention relates to certain improvements in wheels for vehicles and has relation more particularly to a device of this general character in which springs are used to afford the resilient action now commonly accomplished by means of pneumatic tires or the like; and the object of the invention is to provide a novel and improved device of this general character which will be strong and durable and not subject to rapid wear, the device being especially applicable as a traction wheel for an automobile or the like and which provides simple, efficient and comparatively inexpensive cushion wheels adapted to noiselessly absorb all the shocks and jars incident to the travel of an automobile or the like.

The invention consists in the details of construction and in the combination and arrangement of the several parts of our improved wheel whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is an elevational view, with a part in section, of a wheel constructed in accordance with an embodiment of our invention; Fig. 2 is a radial sectional view taken through the device as illustrated in Fig. 1; Fig. 3 is a fragmentary detail elevational view, illustrating certain features of our invention as herein embodied; Fig. 4 is a fragmentary perspective view of a part of one of the guards herein included; Fig. 5 is a view, detached, in perspective of one of the straps embodied in the present form of our invention; Fig. 6 is a view, detached, in perspective of a clip employed in connection with the guards; Fig. 7 is a fragmentary view in plan of a form of tire adapted to be employed in connection with our invention; and Fig. 8 is a view, detached, of an anti-skid lug adapted to be employed in the form of tire illustrated in Fig. 7.

As disclosed in the accompanying drawings, 1 denotes a hub from which radiate the spoke members 2 formed of any desired material but preferably of hard wood and having suitably secured to the outer extremities thereof the rim 3.

Disposed around the rim 3 and positioned concentrically therewith is the outer rim 4 and interposed between said rims 3 and 4 are the radially disposed tensioning members 5, herein disclosed as helical springs, the extremities whereof being suitably engaged with the opposed faces of the rims 4 and 5. The rims 3 and 4 are further united by the inclined tensioning members 6' also disclosed herein as helical members having their extremities secured to suitable lugs 7 positioned on the opposed faces of the rims 3 and 4 in order to resist any possible circumferential movement of the rims 3 and 4 relative to each other during the travel of the wheel. We also find it of advantage to interpose between the rims 3 and 4, in order to prevent crushing of the tensioning members, the straps 8 produced of any preferred material and having their inner extremities hingedly connected, as at 9, to the inner rim while the outer or free extremities thereof are provided with the elongated longitudinally disposed slots 10, through which are directed the lugs 11 depending from the outer rim, it being observed that the pivotal connection 9 and the lug 11 of each of the straps being in offset relation so that said strap is disposed on an incline dependent upon the distance between said pivotal connection 9 and the lug.

Projecting inwardly and radially from the outer rim 4 and overlying the inner rim 3 and the spokes 2 thereof are the housings 12, one face whereof being substantially open. Each of the housings 12 has produced at the lower extremity of its free face the inwardly disposed lugs or ears 14 to which is adapted to be suitably secured the strap 15 also overlying the adjacent spoke 2 whereby it will be readily perceived that the housing 12 is maintained in operative assemblage relative to the spoke. Positioned within the housing 12 and to either side of the spoke 2 disposed therearound are the tensioning members 16 arranged in radial spaced relation whereby it will be readily observed that all shocks and jars incident to the travel of a vehicle, to which our improved wheel may be applied, is substantially entirely absorbed. It is also to be observed that the inner extremities of the housings 12 are adapted to contact, as indicated at 17, whereby substantially all of the housings, or more particularly the tensioning members included therein, are employed to withstand the shocks.

Suitably secured to the portion of the hub 1 facing the vehicle is the annular member 18 with which slidably coacts the annular member 19 the inner marginal portion of which being provided with the spaced annular plate 20 affording the pocket 21 into which the free marginal portion of the plate 18 is adapted to be accommodated whereby it will be readily perceived that the annular member 19 is capable of movement relative to the member 18 in order that no resistance will be offered to the compression of the tensioning members included in our improved wheel as herein set forth. The members 18 and 19 serve as an effective medium to prevent foreign substances, such as dirt or the like, from clogging or otherwise obstructing the wheel proper and in order to afford a requisite guard or shield for the opposite face of the wheel, we provide the disk 22, the central portion of which being offset outwardly and axially in order to free the hub 1 so that no obstruction will be offered to the operation of the wheel.

While any means may be employed for holding the member 19 and the disk 22 in operative engagement with the rim 2 which will operate with facility, we prefer to employ the arrangement disclosed in the accompanying drawings and wherein the under marginal surfaces of the rim 4, at predetermined points thereround, are provided with the transverse recesses 23, in which is adapted to be seated the lugs 24 substantially L-shape in form and inserted between the depending stems of the lugs and the adjacent marginal portions of the members is the annular expanding member 25, whereby it will be readily perceived that upon expanding the member 25 the member 19 and the disk 22 will be effectively clamped into operative position, and for which purpose we find it of advantage to have the outer faces of the annular members 25 and the adjacent faces of the depending stems of the lugs 24 disposed on corresponding bevels. As herein disclosed, each of the expanding members 25 has its opposed extremities operatively connected by the turnbuckle 26, of conventional form and operating in a manner which is believed to be self-evident.

The rim 2 is adapted to have secured to the periphery thereof a suitable tread member, such as a rubber tire 27 as disclosed in Fig. 1, or, in lieu thereof, a metallic tire 28 as disclosed in Fig. 7 may be positioned therearound, such metallic tire being provided with the lugs 29 in order that a more effective gripping may be effected, especially for cross-country travel.

From the foregoing description, it is thought to be obvious that a wheel constructed in accordance with our invention is of an extremely simple and comparatively inexpensive nature and is particularly well adapted for use by reason of the convenience and facility with which it may be employed and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. A device of the character described comprising an inner wheel, said inner wheel including radially disposed spokes, a rim surrounding the inner wheel, cushioning members interposed between the rim and the inner wheel, housings carried by the outer rim disposed inwardly and radially thereof and embracing the spokes of the inner wheel, and cushioning members interposed between the spokes and the sides of the housing, the inner extremities of adjacent housings being in contact one with the other.

2. A device of the character described comprising an inner wheel, said inner wheel including radially disposed spokes, a rim disposed around said inner wheel, cushioning members interposed between the rim and the inner wheel, housings secured to the rim and embracing the spokes of the inner wheel, each of said housings having one face open, inwardly disposed lugs carried by each of the housings at the lower extremity of its open face, a strap secured to said lugs and overlying the adjacent spoke, and cushioning members interposed between the spokes and the sides of the housings.

In testimony whereof we hereunto affix our signatures in the presence of two witnesses.

WILLIAM T. SHEA.
FRANK MANLEY.

Witnesses:
E. H. FERGUSON,
IDA M. SHEA.